United States Patent [19]
Azuma

[11] 3,735,252
[45] May 22, 1973

[54] AUTOMATIC TESTER FOR TESTING RESISTANCE AND INDUCTANCE OF COIL WINDINGS

[76] Inventor: Koichi Azuma, 22 Miyuki, Shikamaku, Himeji, Japan

[22] Filed: July 2, 1971

[21] Appl. No.: 159,260

[52] U.S. Cl. ............................. 324/59, 324/DIG. 1
[51] Int. Cl. ................................................ G01r 11/52
[58] Field of Search ....................... 324/59, DIG. 1

[56] References Cited

UNITED STATES PATENTS

| | | | |
|---|---|---|---|
| 2,540,589 | 2/1951 | Long | 324/DIG. 1 |
| 3,445,764 | 5/1969 | Tedeschi | 324/59 |

FOREIGN PATENTS OR APPLICATIONS

| | | | |
|---|---|---|---|
| 111,171 | 7/1944 | Sweden | 324/59 |
| 451,094 | 7/1936 | Great Britain | 324/59 |

*Primary Examiner*—Stanley T. Krawczewicz
*Attorney*—Ernest G. Montague

[57] ABSTRACT

A coil winding tester has a bridge circuit with two variable resistors connected to the two adjoining sides and two standard coil windings connected to the other two sides. A a power source, it further has D.C. and A.C. connected in parallel to the bridge circuit. A coil winding to be tested, when connected to this invention's circuit, causes a control signal to set one of the thyristors to work an electric magnet, connected to the A.C. power source, via another thyristor. This electric magnet is linked to a change-over switching device to disconnect automatically, via two thyristers, the circuit for the standard coil and forms a circuit for the test coil for testing/measuring the inductance and resistance of the test coil by a galvanometer.

1 Claim, 3 Drawing Figures

Patented May 22, 1973
3,735,252
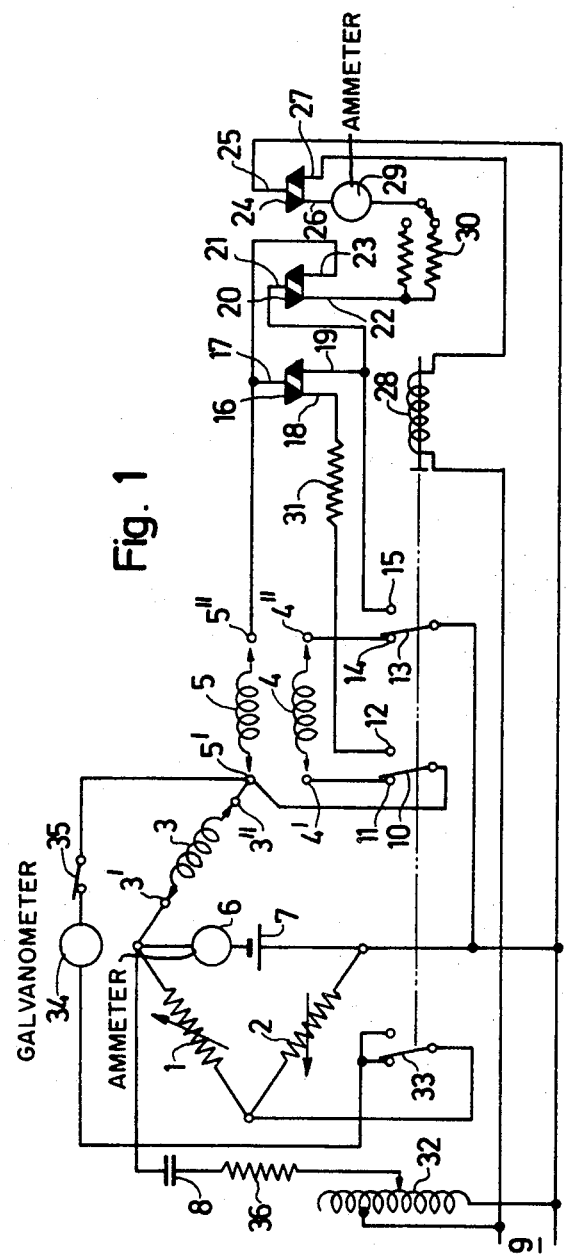
Fig. 1
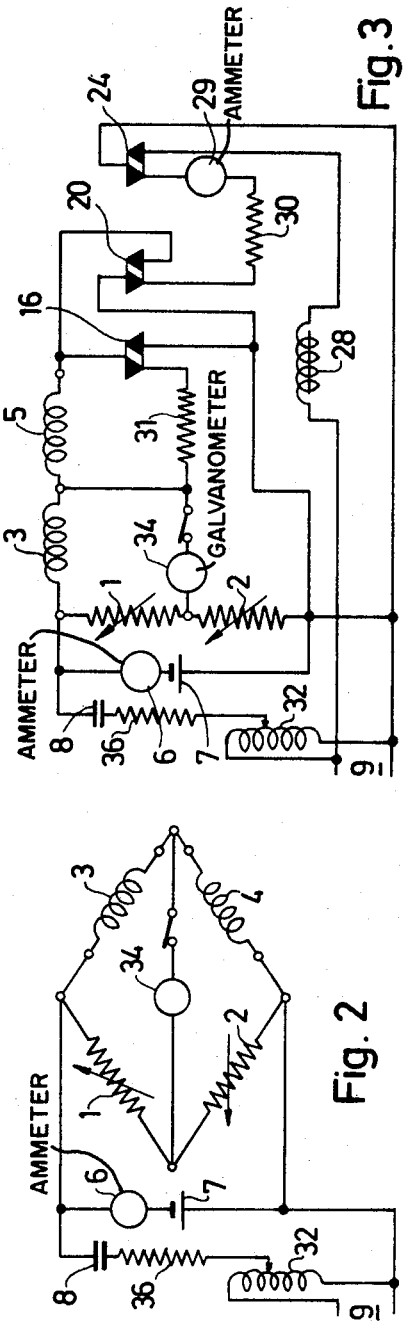
Fig. 2
Fig. 3
INVENTOR.
Koichi Azuma
BY
ATTORNEY

AUTOMATIC TESTER FOR TESTING RESISTANCE AND INDUCTANCE OF COIL WINDINGS

The present invention relates to a coil winding tester, and more particularly, to an improved and simplified coil winding tester for testing/measuring the resistance and inductance of test coils, in comparison with a standard coil winding of known value, by the use of an automatic change-over circuit device equipped with thyristers and a bridge circuit connected in parallel to A.C. and D.C. power source.

It is one object of the present invention to provide a new and convenient means of testing/measuring the inductance and resistance of coil windings to be tested by automatically switching the circuit for one of the two standard coil windings, each being connected to each side of the two sides of the bridge circuit with A.C. and D.C. supplied in parallel thereto, over to the circuit for the test coil.

It is another object of the present invention to provide an automatic tester for testing resistance and inductance of coil windings which comprises a bridge circuit including two variable resistors connected, respectively, to two adjoining sides thereof and two standard coil windings, first and second, connected to the other two sides respectively, and D.C. supply with an amperemeter and also D.C. supply with a condenser connected in parallel with the bridge circuit. When a test coil winding is connected, the control signal across the negative pole and gate of the second thyrister makes the third thyrister work, so as to energize the electric magnet to operate the change-over switch, and the second standard coil's circuit is switched over, via the first and second thyristers, to the circuit for the test coil winding for testing thereof.

With these and other objects in view, which will become apparent in the following detailed description, the present invention will be clearly understood in connection with the accompanying drawings in which:

FIG. 1 is a fundamental circuit for the present invention;

FIG. 2 shows the circuit with the first and second standard coil windings connected therewith; and FIG. 3 shows the circuit with a coil to be tested connected therewith.

Referring now to the drawings, an embodiment of the present invention for automatic testing of resistance and inductance of coil windings is illustrated as comprising a bridge circuit, which has two variable resistors 1 and 2 fitted to the two adjacent sides and also two standard coil windings 3 and 4, constituting other sides of the bridge circuit through connections to connecting terminals 3', 3'', 4' and 4''.

D.C. and A.C. power sources are connected in parallel to the bridge circuit, with a D.C. amperemeter 6 and a condenser 8 inserted, respectively. When the coil winding to be tested is connected as illustrated in FIG. 1, this causes a third thyrister 24 to energize an electric magnet 28, connected to an A.C. power source, by a control signal across the negative pole 23 and the gate 22 of a second thyrister 20, whereby change-over switches 10 and 13 work to switch off the circuit for the second standard coil winding through the actions of first and second thyristors 16 and 20.

According to the present invention, the first and second standard coils 3 and 4 of equal value are connected to the terminals 3', 3'', 4' and 4'' in order to form the bridge circuit as illustrated in FIG. 2. This circuit is then balanced by adjustment of the variable resistors 1 and 2, and in that fixed and balanced state the coil winding 5 to be tested is connected to the test terminals 5' and 5''. Through the coil winding 5 and with an internal resistance across the negative pole 23 and the gate 22 of the second thyrister 20, the control signal is given across the negative pole 27 and the gate 25 or positive pole of the third thyrister, whereby the conductive state across the positive and negative poles 25 and 27 works the magnet coil 28, to set the change-over switch 10, which is connected to the terminal 3'' for the first standard coil winding 3 and a terminal 5'' for the test coil winding 5, and simultaneously to set the change-over switch 13, which is connected with the power source for the bridge circuit.

This arrangement, accordingly, connects the coil winding to be tested 5 to the testing circuit via the first and second thyristers 16 and 20 in place of the second standard coil winding 4, which previously constituted a part of the bridge circuit.

The switch 10, one of the change-over switches, equipped with two-way contact points, is connected to one of the connecting terminals 3'' of the first standard coil winding and also to one of the connecting terminals 5' of the coil winding to be tested 5, with one contact point 11 being connected to the connecting terminal 4' of the standard coil winding 4 and the other contact point 12 being connected to the gate 18 of the first thyrister 16. The other change-over switch 13 is connected to the positive power source for the bridge-circuit, with one contact point 14 being connected to the connecting terminal 4'' of the second standard coil winding 4 and the other contact point 15 being connected both to the negative pole 19 of the first thyrister 16 and the gate or positive pole 21 of the second thyrister 20. Furthermore, the connecting terminal 5'' of the coil winding to be tested is connected with both the positive pole 17 of the first thyrister 16 and the negative pole 23 of the second thyrister 20, while the gate 22 of the second thyrister 20 is connected to the gate 26 of the third thyrister 24 through an auxiliary resistance 30 and an A.C. amperemeter 29.

Further, a galvanometer 34, connected across the adjoining point of the variable resistor 1 and 2 and a connecting terminal 3'' of the first standard coil winding 3, gives a reading for balancing the bridge circuit. The A.C. current needed for the circuit is first adjusted by a resistor 32 and supplied thereto.

In FIG. 1 a safety switch is provided to cut the circuit for the galvanometer 34 off the bridge circuit momentarily together with the change-over switches 10 and 13 when the second standard coil winding 4 is electrically replaced by the coil winding to be tested. A safety resistor 36 is provided for A.C. power supplied to the bridge-circuit.

Now to show an example of an embodiment of the present invention, two standard coils, inductance of which is 0.78 H, are connected across the terminals 3', 3'' and 4', 4'', and the balance of the bridge-circuit is obtained by manipulating the variable resistors 1, 2 with the breaker for galvanometer 34 on.

When a coil winding, of which inductance is known prior, 0.78H, is connected across the terminals 5', 5'' for testing, this coil winding replaces the standard coil winding in the bridge circuit. After the value of auxiliary resistor 30 connected to the A.C. amperemeter 29 has been set in such a way as to have the said amperemeter 29 show a reading of 100 with the afore-mentioned known coil winding of 0.78 H and a reading of 40 with inductance of 1.0 H (in this case the resistance is 10 ), a coil of unknown inductance 5 is then connected to the test terminals 5' and 5''.

Inasmuch as a coil winding 5 of high inductance allows more flow of current than another with lower inductance, the arm of the galvanometer 34 then swings to the minus side in case an error of the coil winding to be tested is over and above plus 0.1 H, when compared with the standard coil winding, and swings less, when the error is less. In this way, inductance and resistance of a test coil winding can be tested in comparison with the standard coil winding.

To describe in more detail, when the circuit for the standard coil 4 is changed over to that of a test coil 5 connected to the test terminals 5' and 5'', the A.C. current is thus connected to the plus side of the D.C. source 7, of the bridge circuit and is connected across the positive and negative poles 25, 27 of the third thyrister 24, which allows a certain amount of A.C. current to the gate 26, whereby A.C. current, regulated by the auxiliary resistor 30, flows across the negative and positive poles 23, 21 through the gate 22 of the second thyrister, and is consequently coupled with D.C. to make it possible, together with A.C. connected to the plus side of the bridge-circuit as mentioned earlier, to test the inductance of test coils.

Thus, the reading of the A.C. amperemeter indicates according to varying degrees of inductance to be measured.

From the foregoing, it will be clear that, according to the present invention, the testing/measuring of the inductance of the test coil windings can be performed, in comparison with the standard coil winding, by the A.C. shunt coupled with D.C. through the actions of thyristers fitted to the circuits of the device, thereby making it possible to test/measure D.C. inductance of coil windings by means of a method for testing/measuring A.C. inductance. Change-over from the standard coil circuit to the test coil circuit is more accurately performed automatically, with precise testing made possible and the overall handling of the device simplified greatly. Unlike other prior art coil winding testers equipped with highly complicated devices and circuits such as synchroscopes and oscillatory circuits, the present invention provides a superior precise testing-/measuring of high sensitivity of individual coil windings to be tested with a simplified circuit structure.

While I have disclosed several embodiments of the present invention, it is to be understood that these embodiments are given by example only and not in a limiting sense.

I claim:

1. A device for automatic testing resistance and inductance of coil windings, comprising in combination
   a bridge circuit having two variable resistors connected respectively, to the two adjoining sides thereof and a first and second standard coil connected, respectively, to the other two sides of said circuit,
   a D.C. power source with an amperemeter and an A.C. power source with a condenser, which are connected to the bridge circuit in parallel,
   a first, a second and third thyrister operatively connected together constituting a thyrister circuit,
   an electro-magnet connected to said third thyrister,
   a switch means controlled by said electro-magnet,
   said second thyrister including a gate and a negative pole,
   means for applying a control signal across the negative pole and the gate of said second thyrister to actuate said third thyrister to energize said electro-magnet and operate said switch means,
   test terminals connected across a coil to be tested and to said first and second thyrister,
   and said switch means operatively connected to said second standard coil and disconnecting the latter when in an open condition.

* * * * *